United States Patent
Poelma

(10) Patent No.: US 11,504,903 B2
(45) Date of Patent: Nov. 22, 2022

(54) 1K ALCOHOL DUAL CURE RESINS FOR ADDITIVE MANUFACTURING

(71) Applicant: Carbon, Inc., Redwood City, CA (US)

(72) Inventor: Justin Poelma, Sunnyvale, CA (US)

(73) Assignee: Carbon, Inc., Redwood City, CA (US)

( * ) Notice: Subject to any disclaimer, the term of this patent is extended or adjusted under 35 U.S.C. 154(b) by 594 days.

(21) Appl. No.: 16/550,592

(22) Filed: Aug. 26, 2019

(65) Prior Publication Data
US 2020/0070409 A1    Mar. 5, 2020

Related U.S. Application Data

(60) Provisional application No. 62/723,824, filed on Aug. 28, 2018.

(51) Int. Cl.
*B29C 64/124*    (2017.01)
*C08L 75/04*    (2006.01)
(Continued)

(52) U.S. Cl.
CPC ............ *B29C 64/124* (2017.08); *C08K 3/013* (2018.01); *C08K 5/0025* (2013.01);
(Continued)

(58) Field of Classification Search
CPC ........ B29C 64/124; C08L 75/04; C08L 33/08; C08L 33/10; C08K 3/013; C08K 5/0025; C08K 5/0041
See application file for complete search history.

(56) References Cited

U.S. PATENT DOCUMENTS 5,236,637 A    8/1993    Hull
5,264,061 A    11/1993    Juskey et al.
(Continued)

FOREIGN PATENT DOCUMENTS

CN    103571211    2/2014
EP    0442071    8/1991
(Continued)

OTHER PUBLICATIONS

Janusziewicz et al., "Layerless Fabrication with Continuous Liquid Interface Production", vol. 113, No. 42, Oct. 18, 2016, pp. 11703-11708.
(Continued)

*Primary Examiner* — Mathieu D Vargot
(74) *Attorney, Agent, or Firm* — Myers Bigel, P.A.

(57) ABSTRACT

Provided herein according to embodiments is a prepolymer compound of formula I:

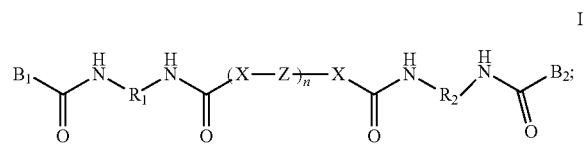

and a prepolymer compound of formula II:

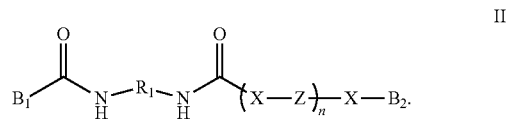

A polymerizable liquid composition comprising the prepolymer compound, methods of use in forming a three-dimensional object, and objects produced are also provided.

22 Claims, 3 Drawing Sheets

(51) Int. Cl.
  *C08L 33/08* (2006.01)
  *C08L 33/10* (2006.01)
  *C08K 3/013* (2018.01)
  *C08K 5/00* (2006.01)
  *B29K 33/00* (2006.01)

(52) U.S. Cl.
  CPC ............ *C08K 5/0041* (2013.01); *C08L 33/08* (2013.01); *C08L 33/10* (2013.01); *C08L 75/04* (2013.01); *B29K 2033/08* (2013.01); *B29K 2033/12* (2013.01)

(56) References Cited

U.S. PATENT DOCUMENTS

| | | | |
|---|---|---|---|
| 5,391,072 | A | 2/1995 | Lawton et al. |
| 5,418,112 | A | 5/1995 | Mirle et al. |
| 5,529,473 | A | 6/1996 | Lawton et al. |
| 5,629,133 | A | 5/1997 | Wolf et al. |
| 5,674,921 | A | 10/1997 | Regula et al. |
| 5,679,719 | A | 10/1997 | Klemarczyk et al. |
| 5,695,708 | A | 12/1997 | Karp et al. |
| 6,309,797 | B1 | 10/2001 | Grinevich et al. |
| 7,438,846 | B2 | 10/2008 | John |
| 7,892,474 | B2 | 2/2011 | Shkolnik et al. |
| 8,110,135 | B2 | 2/2012 | El-Siblani |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,708,440 | B2 | 7/2017 | Das et al. |
| 9,777,097 | B2 | 10/2017 | Liu et al. |
| 2003/0091833 | A1 | 5/2003 | Baumgart et al. |
| 2004/0052966 | A1 | 3/2004 | Wilke et al. |
| 2004/0187714 | A1 | 9/2004 | Napadensky |
| 2007/0178133 | A1 | 8/2007 | Rolland |
| 2007/0205528 | A1 | 9/2007 | Patel et al. |
| 2008/0131692 | A1 | 6/2008 | Rolland et al. |
| 2010/0105794 | A1 | 4/2010 | Dietliker et al. |
| 2012/0007287 | A1 | 1/2012 | Vermeer et al. |
| 2012/0195994 | A1 | 8/2012 | El-Siblani et al. |
| 2013/0292862 | A1 | 11/2013 | Joyce |
| 2013/0295212 | A1 | 11/2013 | Chen et al. |
| 2015/0322291 | A1 | 11/2015 | Salviato et al. |
| 2016/0137839 | A1* | 5/2016 | Rolland ............... C09D 175/04 522/71 |

FOREIGN PATENT DOCUMENTS

| | | |
|---|---|---|
| EP | 0525578 | 2/1993 |
| EP | 0562826 | 9/1993 |
| EP | 0830641 | 3/1998 |
| EP | 1341039 | 9/2003 |
| EP | 1918316 | 5/2008 |
| EP | 2224874 | 9/2010 |
| JP | H02111528 | 4/1990 |
| JP | H09194540 | 7/1997 |
| JP | 2000-007641 | 1/2000 |
| WO | 92/07705 | 5/1992 |
| WO | 96/00412 | 1/1996 |
| WO | 2001/026023 | 4/2001 |
| WO | 2006/045002 | 4/2006 |
| WO | 2015/077419 | 5/2015 |

OTHER PUBLICATIONS

Tumbleston et al., "Continuous Liquid Interface Production of 3D Objects", Science, 347, Mar. 20, 2015, pp. 1349-1352.

Park et al. "UV- and thermal-curing behaviors or dual-curable adhesives based on epoxy acrylate oligomers" International Journal of Adhesion and Adhesives, 29(7): 710-717 (2009).

Malik et al. "A thermally reworkable UV curable acrylic adhesive prototype" International Journal of Adhesion & Adhesives, 22: 283-289 (2002).

Malik et al. "Thermally Controlled Molecular Disassembly of a Crosslinked Polymer Network by the Incorporation of Sterically Hindered Urea Linkages" Journal of Applied Polymer Science, 85: 856-864 (2002).

Malik et al. "The thermally controlled molecular disassembly properties of a polymer network via the incorporation of one sterically hindered urea linkage" Polymer Degradation and Stability, 76: 241-249 (2002).

Malik et al. "Computational study of thermally controlled polymer network disassembly via the incorporation of sterically hindered urea linkages" Polymer, 43: 2561-2567 (2002).

Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).

* cited by examiner

1K ALCOHOL DUAL CURE RESINS FOR ADDITIVE MANUFACTURING

RELATED APPLICATIONS

This application claims priority to U.S. Provisional Application No. 62/723,824, filed Aug. 28, 2018, the disclosure of which is hereby incorporated herein in its entirety.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678, 9,205,601, and 9,216,546 to DeSimone et al.; and also J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606.

SUMMARY

Provided herein according to some embodiments is a prepolymer compound of formula I:

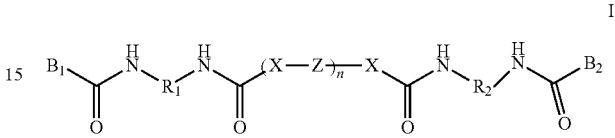

wherein:

$B_1$ is a reactive blocking group (e.g., comprising a group selected from acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and ethylenically unsaturated end groups);

$B_2$ is an alcohol containing group (e.g., a group with a terminal alcohol) (e.g., $-NH(CH_2)_2O(CH_2)_2OH$);

$R_1$ and $R_2$ are each an independently selected hydrocarbyl group (i.e., an aliphatic, aromatic or mixed aliphatic and aromatic group)

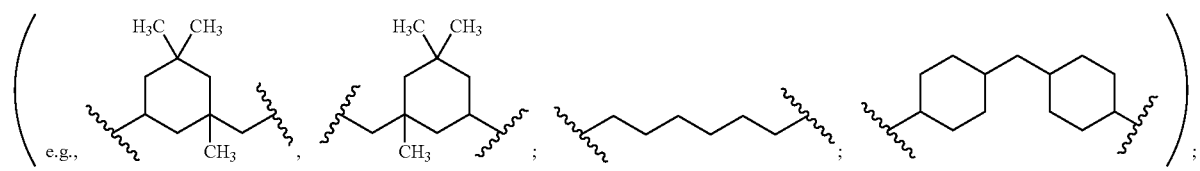

X is O, S, or NR$_3$, wherein R$_3$ is H or a straight chain or branched C$_1$-C$_{10}$ alkyl group;

Z is a hydrocarbyl group (i.e., an aliphatic, aromatic or mixed aliphatic and aromatic group) (e.g., —(CH$_2$)$_3$—); and n is an integer in the range of from 1 to 150.

Also provided is a prepolymer compound of formula II:

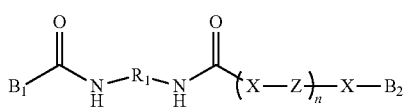

II wherein:

B$_1$ is a reactive blocking group (e.g., comprising a group selected from acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and ethylenically unsaturated end groups);

B$_2$ is an alcohol containing group (e.g., a group with a terminal alcohol) (e.g., —(CH$_2$)$_4$OH);

R$_1$ is a hydrocarbyl group (i.e., an aliphatic, aromatic or mixed aliphatic and aromatic group)

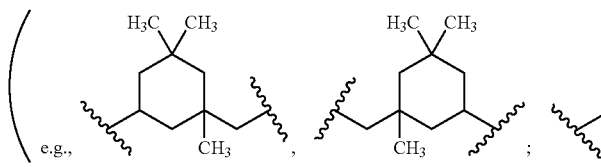

X is O, S, or NR$_3$, wherein R$_3$ is H or a straight chain or branched C$_1$-C$_{10}$ alkyl group;

Z is a hydrocarbyl group (e.g., —(CH$_2$)$_3$—); and n is an integer in the range of from 1 to 150.

In some embodiments of formula I or formula II, B$_1$ is an acrylate or methacrylate

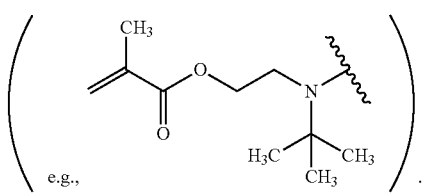

Also provided is a polymerizable liquid composition comprising a prepolymer compound as taught herein.

In some embodiments, the composition further comprises a catalyst (e.g., a tin, zirconium or bismuth catalyst).

In some embodiments, the polymerizable liquid composition further comprises at least one photoinitiator (e.g., in an amount of from 0.1 to 1 or 5 percent by weight), optionally at least one dye (e.g., in an amount of 0.001 or 0.01 to 1 or 5 percent by weight), and optionally at least one filler (e.g., in an amount of 0.01 or 0.1 to 20 or 50 percent by weight).

In some embodiments, the composition is packaged in a single container from which the composition can be dispensed for use.

Further provided is a method of forming a three-dimensional object, comprising:

(a) providing a carrier and an optically transparent member having a build surface, said carrier and said build surface defining a build region therebetween;

(b) filling said build region with a polymerizable liquid, said polymerizable liquid comprising a prepolymer or composition as taught herein;

(c) irradiating said build region with light through said optically transparent member to form a solid polymer scaffold and also advancing said carrier and said build surface away from one another to form a three-dimensional intermediate having the same shape as, or a shape to be imparted to, said three-dimensional object; and then (d) heating said three-dimensional intermediate sufficiently to (i) cleave said blocking group and form an isocyanate, and (ii) react the isocyanate with the alcohol, to form said three-dimensional object.

In some embodiments, the method further comprises washing the intermediate after said irradiating.

In some embodiments, the irradiating is carried out by bottom-up stereolithography (e.g., CLIP).

Still further provided is an object produced by a method as taught herein.

DETAILED DESCRIPTION OF ILLUSTRATIVE EMBODIMENTS

Figure 1:
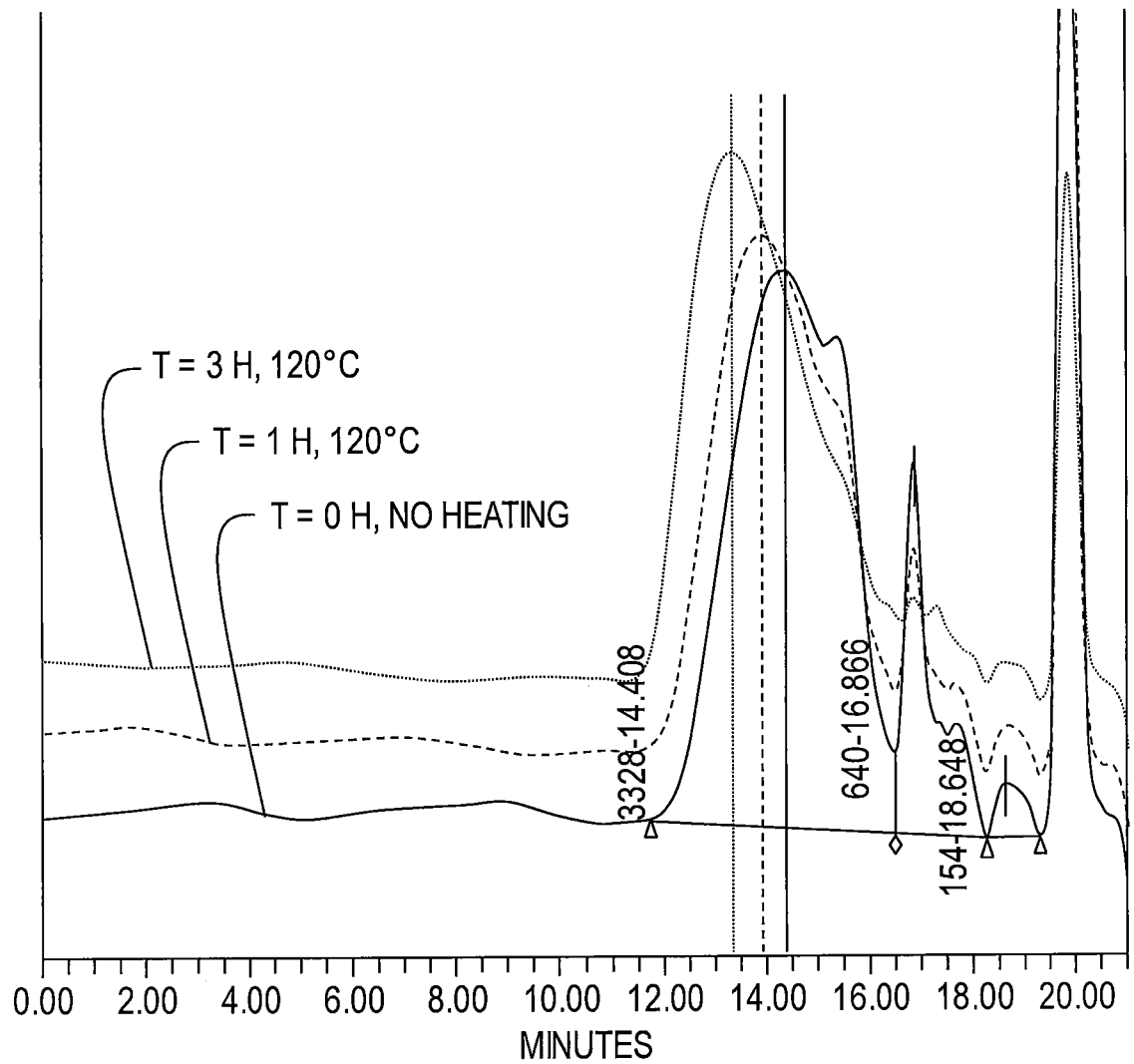
FIG. 1: Molecular weight evolution of neat AB-ABPU, with no added catalyst, upon heating at 120° C. for 0-3 hours. The traces show a shift to shorter retention times (higher molecular weights) as a function of time.

The present invention is now described more fully hereinafter. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as

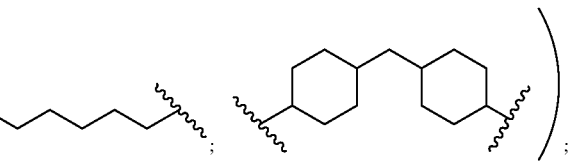

commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"ABPU" as used herein refers to UV-curable, (meth) acrylate blocked, polyurethane/polyurea (i.e., reactive blocked polyurethane) such as described in U.S. Pat. Nos. 9,453,142 and 9,598,606 to Rolland et al. A particular example of a suitable reactive (or UV-curable) blocking group is a tertiary amine-containing (meth)acrylate (e.g., t-butylaminoethyl methacrylate, t-BAEMA).

An "alcohol containing group" as used herein refers to a hydrocarbyl group comprising one or more alcohols (-OH).

"Hydrocarbyl" as used herein refers to a bifunctional hydrocarbon group, which hydrocarbon may be aliphatic, aromatic, or mixed aliphatic and aromatic, and optionally containing one or more (e.g. 1, 2, 3, or 4) heteroatoms (typically selected from N, O, and S).

Such hydrocarbyl groups may be optionally substituted and may contain from 1, 2, or 3 carbon atoms, up to 6, 8 or 10 carbon atoms or more, and up to 40, 80, or 100 carbon atoms or more.

1. Polymerizable Liquids (Resins).

Resins. Dual cure additive manufacturing resins, including polyurethane dual cure resins, are described in, for example, Rolland et al., U.S. Pat. Nos. 9,676,963; 9,598,606; and 9,453,142, the disclosures of which are incorporated herein by reference.

In some embodiments, monomers and/or prepolymers polymerizable by exposure to actinic radiation or light are those comprising reactive end groups selected from the group consisting of acrylates, methacrylates, a-olefins, N-vinyls, acrylamides, methacrylamides, styrenics, epoxides, thiols, 1,3-dienes, vinyl halides, acrylonitriles, vinyl esters, maleimides, and vinyl ethers.

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). Additional examples include but are not limited to those given in U.S. Pat. No. 3,694,389 to Levy.

Catalysts useful in carrying out the present invention include those that may catalyze the reaction of isocyanate with hydroxyl groups include, but are not limited to, a tin catalyst (e.g., dibutyltin dilaurate), a zirconium catalyst (e.g., zirconium chelate) such as K-KAT 36212 (King Industries, Inc.), a bismuth catalyst (e.g., bismuth carboxylate) such as K-KAT XK-651 (King Industries, Inc.), etc.

Pigment/non-reactive light absorbers. In some embodiments, polymerizable liquids for carrying out the present invention include a non-reactive pigment or dye that may absorb light, particularly UV light. Suitable examples include, but are not limited to: (i) a titanium dioxide based white pigment (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to no more than 15,000, 10,000, 6,000, 5,000, 4,000, or 3,000 centipoise at 25 degrees Centigrade). Suitable examples of diluents include, but are not limited to, ethylene glycol dimethacrylate, N,N-dimethylacrylamide, N-vinyl-2-pyrrolidone, and N-vinyl formamide, or a mixture of two or more thereof. The diluent may be included in the polymerizable liquid in any suitable amount, typically from 1, 5 or 10 percent by weight, up to about 30 or 40 percent by weight, or more.

Accelerators. In some embodiments, the liquid may include a deoxygenating compound as an accelerator of stereolithography (particularly CLIP). An example of such a suitable accelerator is triphenylphosphine.

1K resins. Resin formulations as taught here may be particularly useful for packaging in a single container from which the dual cure resin is dispensed for use in producing three-dimensional objects ("1K" or "one pot" resin).

2. Production by Additive Manufacturing.

Polymerizable liquids or resins as described herein may be used to make three-dimensional objects, in a "light" cure (typically by additive manufacturing) which in some embodiments generates a "green" intermediate object, followed in some embodiments by a second (typically heat) cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678, 9,205,601, 9,216,546, and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145182).

After the intermediate three-dimensional object is formed, it is optionally cleaned, optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

3. Cleaning or Washing.

Objects as described above can be cleaned in any suitable apparatus, in some embodiments with a wash liquid as described above and below, and in other embodiments by wiping (with an absorbent, air blade, etc.) spinning, or variations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tent-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

4. Further Curing.

After cleaning, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the intermediate may be heated to a temperature of at least about 100, 110, 120 or 130° C., up to about 140, 150 or 160° C. For example, the intermediate may be heated to a temperature of about 110° C. to about 140° C.

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

The present invention is further described in the following non-limiting examples.

EXAMPLES

Synthesis and Polymerization of a Heterobifunctional (AB)-ABPU

Abbreviations:

IPDI—isophorone diisocyanate

PTMO—poly(tetramethylene oxide)

AEE—2-(2-aminoethoxy)ethanol

TBAEMA—tert-butylaminoethyl methacrylate

Herein is detailed the synthesis of a heterobifunctional ABPU which can undergo a step-growth polymerization upon heating. The reactive polymer can be blended with reactive diluents and a photoinitiator to obtain a photopolymer resin suitable for 3d printing. After obtaining a 3d object by CLIP, the final mechanical properties are achieved by heating the part to at least 120° C. to generate high molecular weight linear polyurea-urethane inside the 3d printed object.

One advantage of the (AB)-ABPU is that single component (1k, single pot) resins can be formulated since both reactive functionalities, alcohol and blocked isocyanate, are contained in one molecule. The low reactivity of the alcohol with the blocked isocyanates allow for a shelf stable and reusable product, minimizing waste from left-over resin after printing.

Other advantages over some two-component dual cure resins include the absence of an amine functional Part B which can be extracted during washing of the parts, may pose health hazards, and may reduce the green strength of the part by plasticization.

Scheme 1. Synthesis of example (AB)-ABPU containing a blocked isocyanate and an alcohol.

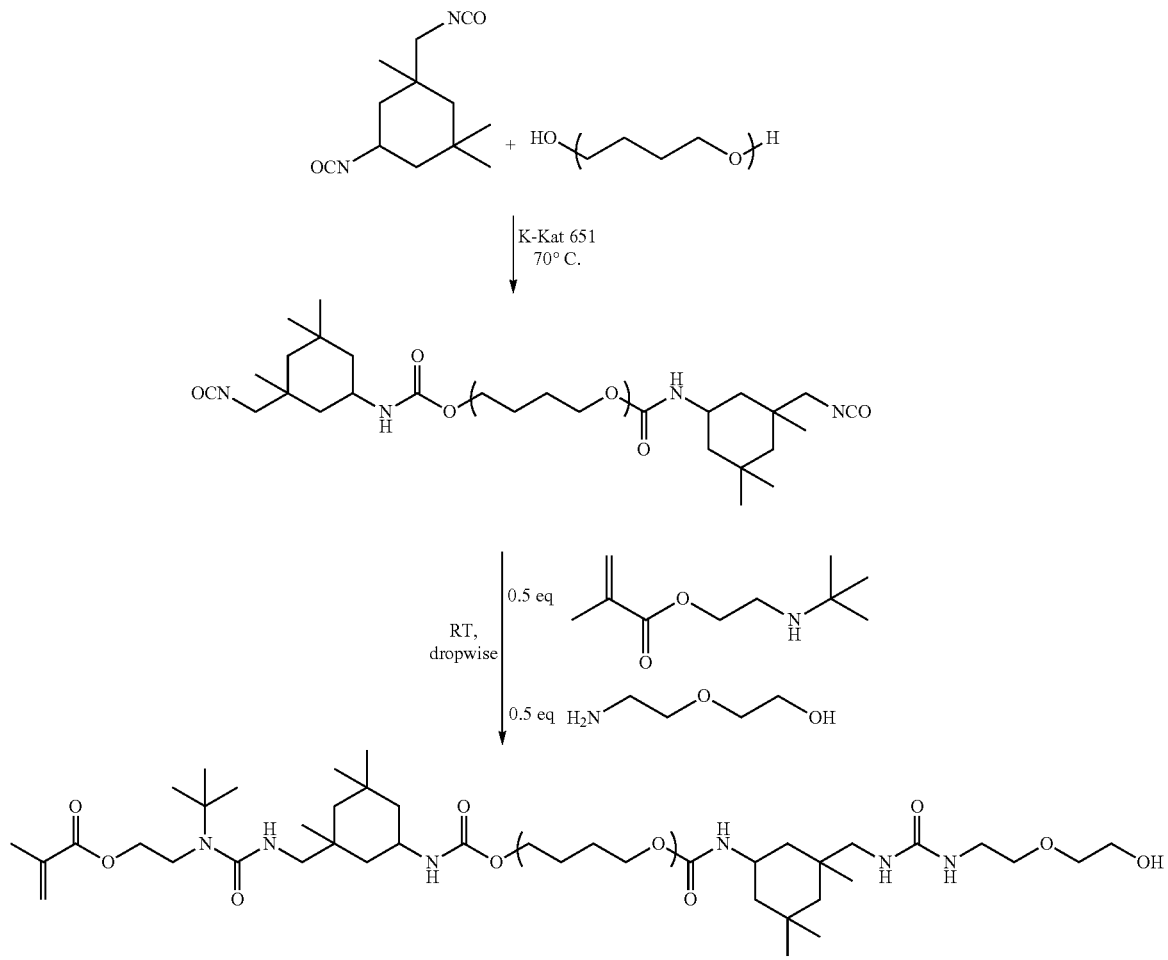

TABLE 1

Formulation for synthesis of (AB)-ABPU shown in Scheme 1.

| Component | Molecular weight (g/mol) | Mass (g) | mol | mol OH | mol NCO | mol NH$_2$ |
|---|---|---|---|---|---|---|
| PTMO | 650 | 187.50 | 0.2885 | 0.5769 | | |
| IPDI | 222.3 | 128.25 | | | 1.1538 | |
| TBAEMA | 185.35 | 53.47 | | | | 0.2885 |
| AEE | 105.14 | 30.33 | | | | 0.2885 |
| K-Kat 6212 | | 0.0947 | | | | |

According to Table 1 above, IPDI and the catalyst, K-Kat 6212, were charged to a round-bottom reactor equipped with an overheard stirrer and heated to 70° C. PTMO was then added dropwise to form an isocyanate terminated prepolymer shown in Scheme 1. After complete consumption of the polyol functionality, the reactor was cooled to 40° C. followed by the dropwise addition of an equimolar mixture of TBAEMA and AEE to yield the final (AB)-ABPU shown in Scheme 1.

Figure 2:
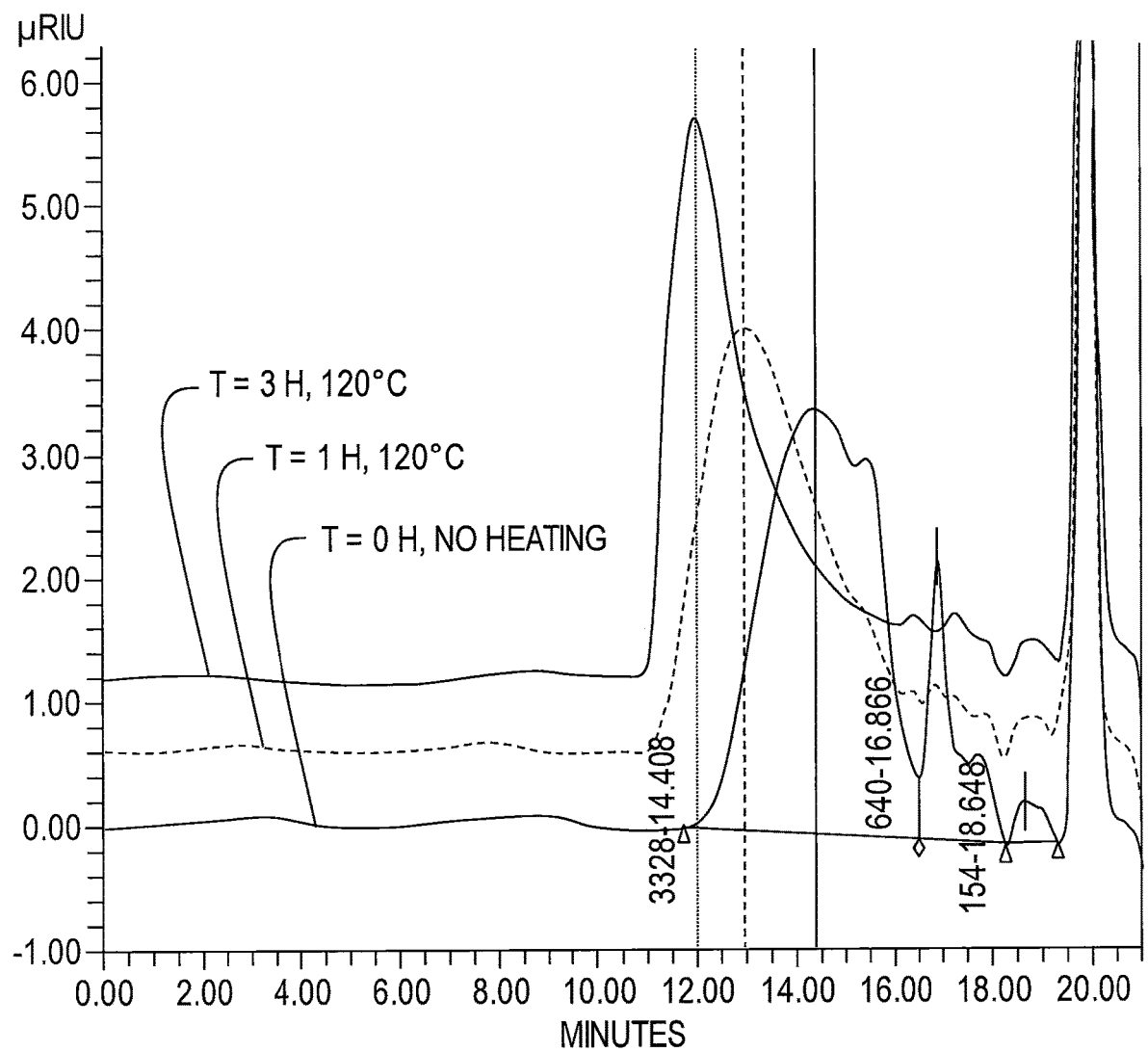
FIG. 2: Molecular weight evolution of AB-ABPU with 0.5 wt % K-Kat XK-651 bismuth catalyst upon heating for 0-3 hours at 120° C. The traces shift to lower retention times compared to the uncatalyzed systems in FIG. 1, suggesting a faster rate of polymerization.
Figure 3:
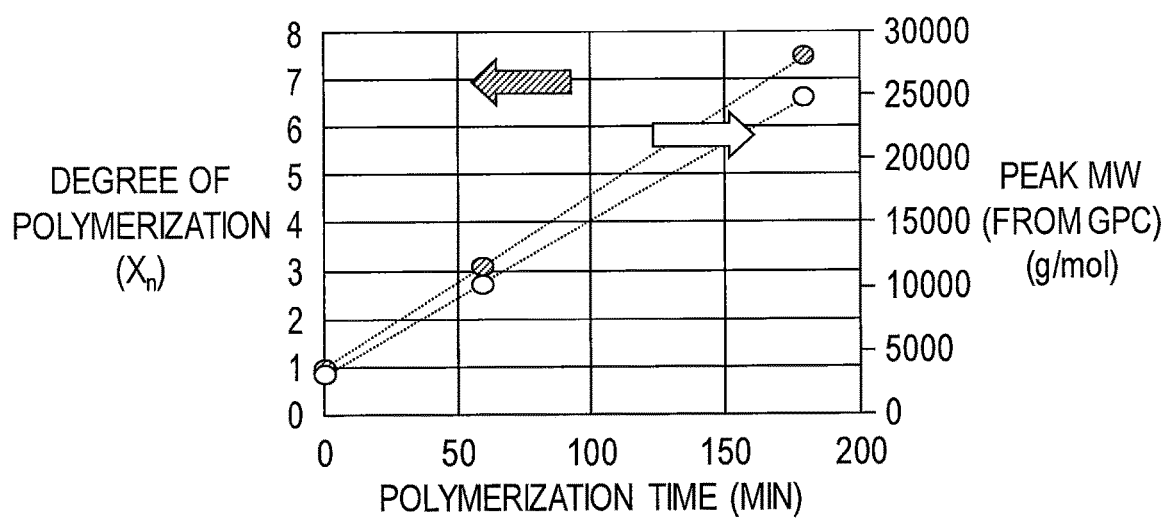
FIG. 3: X$_n$ vs. time and MW vs. time for polymerization of AB-ABPU catalyzed by 0.5 wt % K-Kat XK-651. The linear polymerizations kinetics are consistent with a catalyzed AB step-growth polymerization.

The heterobifunctional ABPU obtained from the reaction above was then heated at 120° C. for 0-3 hours to induce the step-growth polymerization of the alcohol chain end with the blocked isocyanate chain end. In this sense, the (AB)-ABPU is an AB-type macromonomer. Over the course of several hours, the molecular weight increases as shown by the GPC traces in FIG. 1. In the presence of a catalyst, such as 0.5 wt % K-Kat 651, the step-growth polymerization kinetics are improved as shown by GPC traces in FIG. 2. In the catalyzed polymerization, the molecular weight after 3 hours was about 3 times the uncatalyzed polymerization of the (AB)-ABPU.

The peak molecular weight from the GPC traces were used to estimate the degree of polymerization, $X_n$, which was found to be linear with polymerization time. This is consistent with the polymerization kinetics of a catalyzed step-growth polymerization.

TABLE 2

Sample formulation

| Component | Parts by weight |
|---|---|
| (AB)-ABPU | 555 |
| IBOMA | 440 |
| TPO | 4 |
| K-Kat XK-651 | 1 |
| Modulus (MPa) | 1100 |

TABLE 2-continued

| Sample formulation | |
|---|---|
| Component | Parts by weight |
| Ultimate Tensile Strength (MPa) | 23 |
| % Elongation at Break | 3 |

In the above example formulation, the components were combined and mixed in a Thinky mixer until the photoinitiator was dissolved. The photopolymer resin was cast into dogbone test specimen molds, flood cured by UV LEDs, and heated for 4 hours at 120° C. The final parts were measured to have the properties listed above. A control in which XK-651 was not added were too brittle to remove from the mold.

Additional example synthetic routes to (AB)-ABPUs are shown in Scheme 2:

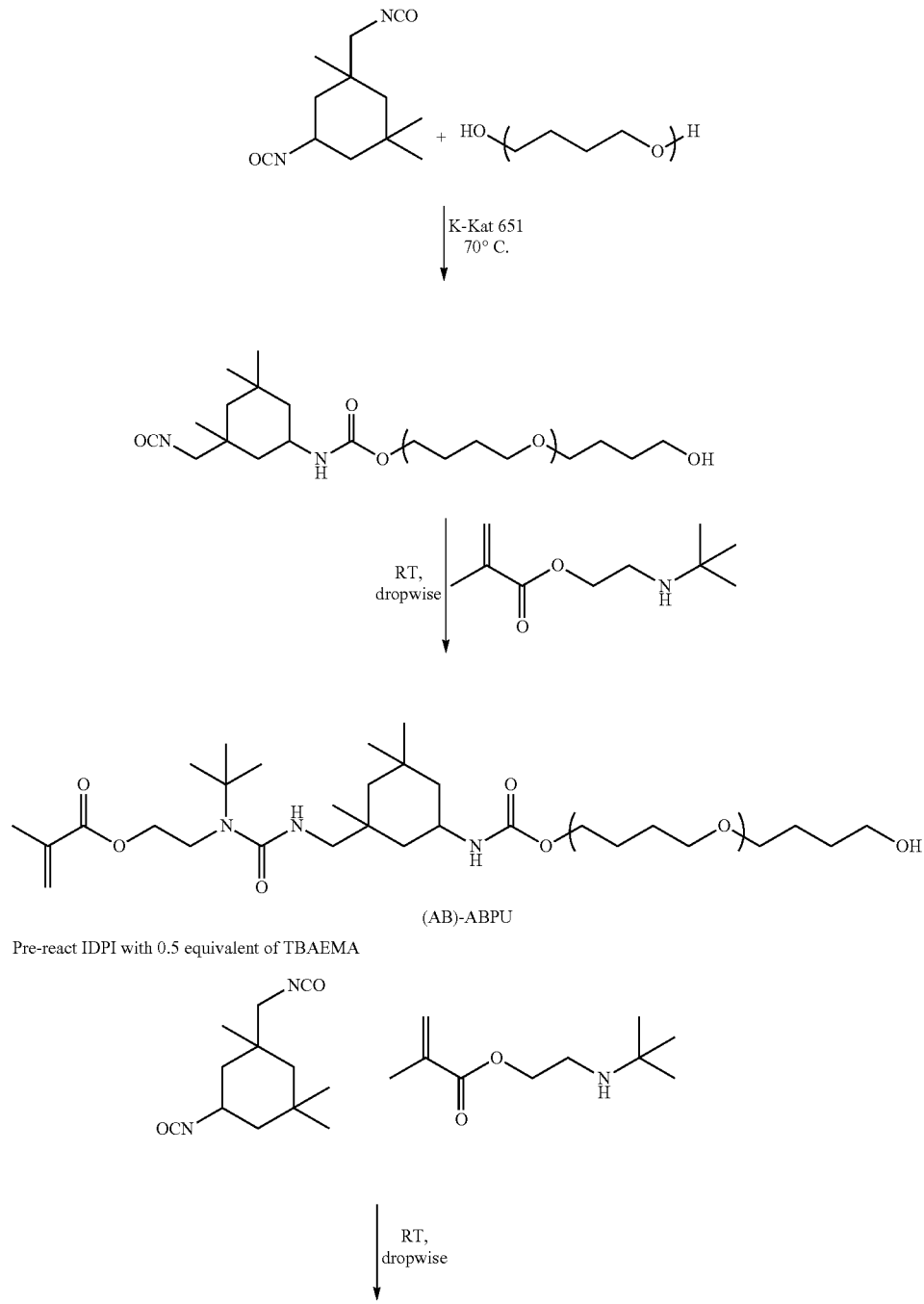

Scheme 2. Example synthetic routes to (AB)-ABPUs.

-continued

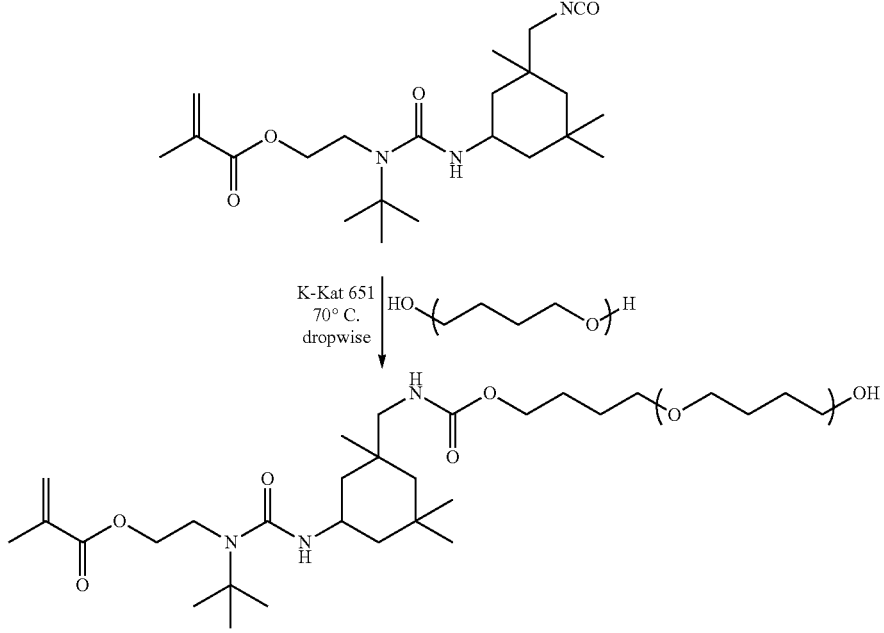

The foregoing is illustrative of the present invention, and is not to be construed as limiting thereof. The invention is defined by the following claims, with equivalents of the claims to be included therein.

What is claimed is:

1. A prepolymer compound of formula I:

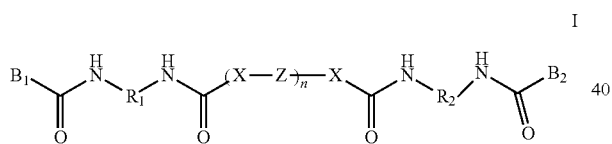

wherein:
- $B_1$ is a reactive blocking group that is polymerizable by exposure to actinic radiation of light;
- $R_1$ and $R_2$ are each an independently selected hydrocarbyl group;
- X is O, S, or $NR_3$, wherein $R_3$ is H or a straight chain or branched $C_1$-$C_{10}$ alkyl group;
- Z is a hydrocarbyl group;
- $B_2$ is an alcohol-containing group; and
- n is an integer in the range of from 1 to 150.

2. The prepolymer compound of claim 1, wherein $B_1$ is an acrylate or methacrylate.

3. A polymerizable liquid composition comprising the prepolymer compound of claim 1.

4. The composition of claim 3, wherein said composition further comprises a catalyst.

5. The composition of claim 3, said polymerizable liquid composition further comprising at least one photoinitiator, optionally at least one dye, and optionally at least one filler.

6. The composition of claim 3, wherein said composition is shelf stable and packaged in a single container from which the composition can be dispensed for use.

7. A method of forming a three-dimensional object, comprising:
(a) providing a carrier and an optically transparent member having a build surface, said carrier and said build surface defining a build region therebetween;
(b) filling said build region with a polymerizable liquid, said polymerizable liquid comprising the prepolymer compound of claim 1;
(c) irradiating said build region with light through said optically transparent member to react monomers and/or prepolymers polymerizable by exposure to actinic radiation or light, wherein said monomers and/or prepolymers polymerizable by exposure to actinic radiation or light comprise the prepolymer compound of formula I, to form a solid polymer scaffold and also advancing said carrier and said build surface away from one another to form a three-dimensional intermediate having the same shape as, or a shape to be imparted to, said three-dimensional object; and then
(d) heating said three-dimensional intermediate sufficiently to (i) cleave said blocking group and form an isocyanate, and (ii) react the isocyanate with the alcohol, to form said three-dimensional object.

8. The method of claim 7, wherein said method further comprises washing the intermediate after said irradiating.

9. The method of claim 7, wherein said heating is to a temperature of about 110° C. to about 140° C.

10. The method of claim 7, wherein said irradiating is carried out by bottom-up stereolithography.

11. An object produced by the method of claim 7.

12. A prepolymer compound of formula II:

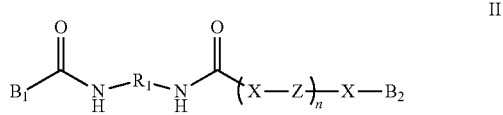

wherein:
- $B_1$ is a reactive blocking group that is polymerizable by exposure to actinic radiation or light;
- $B_2$ is an alcohol-containing group;
- $R_1$ is a hydrocarbyl group;
- X is O, S, or $NR_3$, wherein $R_3$ is H or a straight chain or branched $C_1$-$C_{10}$ alkyl group;
- Z is a hydrocarbyl group; and
- n is an integer in the range of from 1 to 150.

13. The prepolymer compound of claim 12, wherein $B_1$ is an acrylate or methacrylate.

14. A polymerizable liquid composition comprising the prepolymer compound of claim 12.

15. The composition of claim 14, wherein said composition further comprises a catalyst.

16. The composition of claim 14, said polymerizable liquid composition further comprising at least one photoinitiator, optionally at least one dye, and optionally at least one filler.

17. The composition of claim 14, wherein said composition is shelf stable and packaged in a single container from which the composition can be dispensed for use.

18. A method of forming a three-dimensional object, comprising:
   (a) providing a carrier and an optically transparent member having a build surface, said carrier and said build surface defining a build region therebetween;
   (b) filling said build region with a polymerizable liquid, said polymerizable liquid comprising the prepolymer compound of claim 12;
   (c) irradiating said build region with light through said optically transparent member to react monomers and/or prepolymers polymerizable by exposure to actinic radiation or light, wherein said monomers and/or prepolymers polymerizable by exposure to actinic radiation or light comprise the prepolymer compound of formula II, to form a solid polymer scaffold and also advancing said carrier and said build surface away from one another to form a three-dimensional intermediate having the same shape as, or a shape to be imparted to, said three-dimensional object; and then
   (d) heating said three-dimensional intermediate sufficiently to (i) cleave said blocking group and form an isocyanate, and (ii) react the isocyanate with the alcohol, to form said three-dimensional object.

19. The method of claim 18, wherein said method further comprises washing the intermediate after said irradiating.

20. The method of claim 18, wherein said heating is to a temperature of about 110° C. to about 140° C.

21. The method of claim 18, wherein said irradiating is carried out by bottom-up stereolithography.

22. An object produced by the method of claim 18.

* * * * *

UNITED STATES PATENT AND TRADEMARK OFFICE
CERTIFICATE OF CORRECTION

PATENT NO. : 11,504,903 B2
APPLICATION NO. : 16/550592
DATED : November 22, 2022
INVENTOR(S) : Justin Poelma It is certified that error appears in the above-identified patent and that said Letters Patent is hereby corrected as shown below:

In the Specification

Column 5, Line 37: Please correct "a-olefins," to read --α-olefins,--

Column 5, Line 47: Please correct "o-tolidine" to read --*o*-tolidine--

Column 9, Line 16: Please correct "tent-butanol," to read --*tert*-butanol,--

Signed and Sealed this
Fourth Day of April, 2023

Katherine Kelly Vidal
*Director of the United States Patent and Trademark Office*